J. WHIPPS.
HARROW TOOTH.
APPLICATION FILED DEC. 6, 1913.
1,109,493.
Patented Sept. 1, 1914.
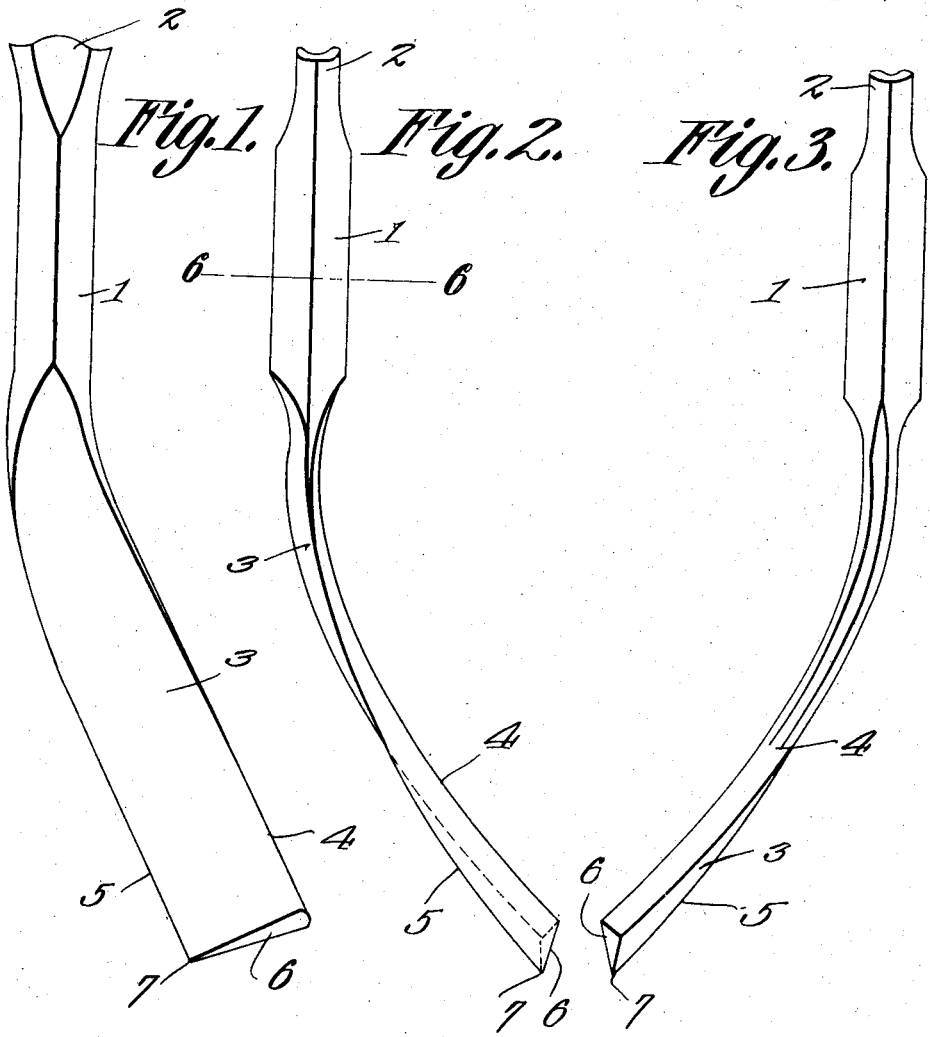
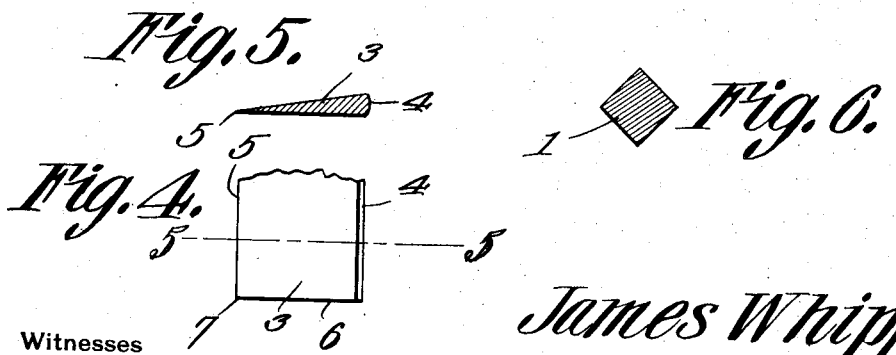

UNITED STATES PATENT OFFICE.

JAMES WHIPPS, OF CARLISLE, INDIANA.

HARROW-TOOTH.

1,109,493.  Specification of Letters Patent. Patented Sept. 1, 1914.

Application filed December 6, 1913. Serial No. 805,081.

*To all whom it may concern:*

Be it known that I, JAMES WHIPPS, a citizen of the United States, residing at Carlisle, in the county of Sullivan and State of Indiana, have invented a new and useful Harrow-Tooth, of which the following is a specification.

The present invention appertains to a harrow tooth, and is particularly an improvement over the harrow tooth disclosed in my former Patent No. 985,871, issued March 7, 1911.

It is the object of the present invention to provide a harrow tooth of unique or novel formation, whereby the tooth may be conveniently applied to a harrow frame, and in order that the blade of the tooth will be so formed and disposed, as to most effectively agitate the soil for pulverizing and leveling the same, and to destroy weeds, and other foreign vegetation.

It is also the object of the present invention to provide a harrow tooth of the character specified, which shall reduce to a minimum, the tendency of the tooth being clogged with roots, and other extraneous matter or trash.

A further object of the present invention is to provide a harrow tooth which may be readily and inexpensively forged from a bar or similar stock.

With the foregoing and other objects in view, which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention has been illustrated in its preferred embodiment in the accompanying drawing, wherein:—

Figure 1 is a side elevation of the improved harrow tooth. Fig. 2 is a front view thereof. Fig. 3 is a rear view. Fig. 4 is a fragmental view of the end of the blade. Fig. 5 is a cross section of the blade taken on the line 5—5 of Fig. 4. Fig. 6 is a cross section of the shank, taken on the line 6—6 of Fig. 2.

The present harrow tooth is preferably formed from a bar or similar stock, similar to the harrow tooth disclosed in the above mentioned patent. The bar or blank is fashioned to provide the shank 1 of rectangular or square cross section, having its upper end flattened, as at 2, to form a head for retaining the shank in engagement with the harrow frame, whereby the harrow tooth will not be liable to work loose and become lost. The head 2 is preferably formed by pressing or swaging together, the upper portions of two opposite corners of the shank 1, whereby the other opposite corners will be extended to form the head. The bar is also formed to provide the blade 3 depending from the shank 1, the blade 3 being forged. One edge of the blade is relatively thick, as at 4, and is disposed rearwardly while the other edge 5 is relatively sharp and is disposed forwardly, the edge 5 forming a cutting edge for engaging the soil. The end 6 of the blade is at right angles to the edges 4 and 5.

The blade 3 is curved to one side of the axis of the shank 1, as seen in Figs. 2 and 3, and is extended angularly rearward from the axis of the shank, as seen in Fig. 1, whereby the corner 7 of the blade between the sharp edge 5 and the end 6 is lowermost, to constitute the tip or nose of the tooth. It is also to be noted that the lower end portion of the blade is inclined, and that the thick edge of the blade is elevated above the sharp edge, at the lower end of the blade, as will be evident from Figs. 2 and 3. This latter feature is of advantage, inasmuch as the lower end portion of the blade acts in the capacity of a share or deflecting portion, to stir the soil underneath the surface.

In practice, the harrow teeth, are formed in rights and lefts, whereby a plurality of right and left hand harrow teeth may be applied to a harrow frame in proper arrangement with respect to one another. Thus, the right and left handed teeth may be arranged in series or rows, or may be staggered, whichever may be desired.

As above intimated, the sharp edge 5 of the blade is displaced forwardly, so as to cut or sever the soil as the harrow frame is dragged or drawn over the soil, the tip or nose 7 serving to effectively enter the soil. It will be noted that the sharpened edge 5 curves rearwardly and downwardly, whereby there will be little or no tendency for roots, trash and the like, clogging the tooth, which is a highly desirable feature. With the blade formed as above defined, the same will produce a most effective agitation of the soil, whereby the surface of the soil may be pulverized and leveled efficiently.

From the foregoing, taken in connection with the drawing, the advantages incident to the improved harrow tooth, will be obvious to those familiar with the art, and need not be further commented upon.

The shank 1 may not only be of square cross section, but may be diamond shaped or parallelogram in cross section, if desired.

Having thus described the invention, what is claimed as new is:—

A harrow tooth formed from a bar and embodying an upright shank having a depending forged blade, one edge of the blade being relatively sharp and disposed forwardly, and the other edge being relatively thick and disposed rearwardly, the end of the blade being at right angles to the edges, the blade being curved to one side and extending angularly rearward from the axis of the shank, the lower end portion of the blade being inclined, the corner of the blade between the sharp edge and end being lowermost, to constitute the nose of the tooth, and the thick edge being elevated above the sharp edge at the lower end of the blade.

In testimony that I claim the foregoing as my own, I have hereto affixed my signature in the presence of two witnesses.

JAMES WHIPPS.

Witnesses:
F. W. SCHROEDER,
JAMES R. PALMER.

---

Copies of this patent may be obtained for five cents each, by addressing the "Commissioner of Patents, Washington, D. C."